(12) United States Patent
Shiga et al.

(10) Patent No.: US 7,989,556 B2
(45) Date of Patent: Aug. 2, 2011

(54) MODIFIER FOR POLYESTER RESIN AND PROCESS FOR PRODUCING MOLDED ARTICLE WITH THE SAME

(75) Inventors: Kenji Shiga, Otsu (JP); Mitsuo Nishida, Otsu (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 482 days.

(21) Appl. No.: 10/594,031

(22) PCT Filed: Dec. 1, 2004

(86) PCT No.: PCT/JP2004/017832
§ 371 (c)(1),
(2), (4) Date: Sep. 25, 2006

(87) PCT Pub. No.: WO2005/092982
PCT Pub. Date: Oct. 6, 2005

(65) Prior Publication Data
US 2007/0173629 A1    Jul. 26, 2007

(30) Foreign Application Priority Data

Mar. 25, 2004 (JP) .................................. 2004-088894

(51) Int. Cl.
*C08G 59/00* (2006.01)
(52) U.S. Cl. ........ 525/438; 525/418; 525/419; 525/437; 525/440.01; 525/449; 525/454; 525/176
(58) Field of Classification Search .................... 521/48; 525/418, 419, 437, 438, 440.01, 449, 454, 525/176
See application file for complete search history.

(56) References Cited

U.S. PATENT DOCUMENTS

| | | | | |
|---|---|---|---|---|
| 3,350,328 | A * | 10/1967 | Canonica et al. | 521/48 |
| 3,953,404 | A * | 4/1976 | Borman | 525/437 |
| 4,172,859 | A | 10/1979 | Epstein | |
| 4,915,885 | A * | 4/1990 | Avramova et al. | 264/28 |
| 5,183,863 | A | 2/1993 | Nakamura et al. | |
| 5,268,438 | A | 12/1993 | Carson et al. | |
| 5,314,948 | A * | 5/1994 | Pratt et al. | 525/64 |
| 7,084,214 | B2 * | 8/2006 | Shiga et al. | 525/438 |
| 2003/0153640 | A1 * | 8/2003 | Moens et al. | 522/65 |
| 2004/0010073 | A1 | 1/2004 | Shiga et al. | |

FOREIGN PATENT DOCUMENTS

| | | |
|---|---|---|
| EP | 0 531 093 A1 | 3/1993 |
| EP | 1 059 335 A2 | 12/2000 |
| EP | 1 293 527 A1 | 3/2003 |
| JP | 59-028223 A | 7/1984 |
| JP | 63-241062 A | 10/1988 |
| JP | 03-177412 A | 8/1991 |
| JP | 04-353514 A | 12/1992 |
| JP | 11-269360 | 10/1999 |
| JP | 2000-355657 | 12/2000 |
| JP | 2001-002903 | 1/2001 |
| JP | 2001-114995 | 4/2001 |
| JP | 03-237913 B2 | 10/2001 |
| JP | 3237913 B2 | 10/2001 |
| JP | 2002-146167 | 5/2002 |
| JP | 2002-249649 | 9/2002 |
| JP | 2003-238777 A | 8/2003 |
| JP | 2003-238777 A | 8/2003 |
| JP | 2003-238778 | 8/2003 |
| JP | 2003-238778 A | 8/2003 |
| JP | 2004-189880 A | 7/2004 |
| WO | WO 02/50201 A1 | 6/2002 |
| WO | WO 02/055620 A2 | 7/2002 |
| WO | WO 2004/033554 | 4/2004 |

OTHER PUBLICATIONS

Machine translation of JP2003-238777.*
Supplementary European Search Report from counterpart Application No. EP 04 82 1755.8, Apr. 12, 2007.
English translation of the abstract of JP 2003-238777A, Aug. 27, 2003.
Office Action dated Apr. 29, 2008 in Korean Patent Application No. 10-2006-7020640, and the English translation of the Office Action.

* cited by examiner

*Primary Examiner* — David Wu
*Assistant Examiner* — Robert Jones
(74) *Attorney, Agent, or Firm* — Kenyon & Kenyon LLP (57) ABSTRACT

An object of the present invention is to provide a modifier which improves moldability in melt molding, particularly, injection molding, extrusion molding, profile molding, direct blow molding, or calendar processing molding using a polyester resin and, furthermore, which can improve mechanical physical property while maintaining transparency, and a polyester molded article using the modifier. The present invention relates to a modifier for a polyester resin, comprising an amorphous polyester resin (I), and a reactive compound (II) containing two or more glycidyl groups and/or isocyanate groups per one molecule and having a weight average molecular weight of not less than 200 and not more than 500 thousands.

31 Claims, 1 Drawing Sheet

MODIFIER FOR POLYESTER RESIN AND PROCESS FOR PRODUCING MOLDED ARTICLE WITH THE SAME

This is a 371 national phase application of PCT/JP2004/017832 filed 1 Dec. 2004, claiming priority to Japanese Patent Applications No. 2004-088894 filed 25 Mar. 2004, the contents of which are incorporated herein by reference.

TECHNICAL FIELD

The present invention relates to a modifier particularly suitable for modifying a polyester resin. More particularly, the present invention relates to a polyester resin molded article which improves moldability in injection molding, extrusion molding, profile molding, T die extrusion molding, direct blow molding, and calendar processing molding, and improves mechanical physical property while maintaining transparency.

BACKGROUND ART

In recent years, there is movement of replacing a vinyl chloride-based resin with other material because of, for example, a problem of environmental influence. Among numerous substitute materials, a polyester resin is an influential material in terms of its physical nature, environmental suitability, adhesive property, cost and the like.

Among polyester resins, a crystalline polyester resin such as polyethylene terephthalate (PET), polybutylene terephthalate (PBT), polyethylene naphthalate (PEN), polylactic acid and the like is molded into heat resistant parts by injection molding, into films, or sheets by extrusion molding, into drink bottles by blow molding, and into fibers by melt spinning.

On the other hand, since an amorphous polyester resin is excellent in transparency, gloss, impact resistance, and stress whitening suppression and, further, is easy in molding processibility as compared with a crystalline polyester, a representative of which is PET, the resin is molded into monolayer or multilayer sheets, lamination films, or shrinkable films by extrusion molding, into miscellaneous goods, stationery, or cosmetic containers by injection molding, or into price rails, or IC tubes by profile molding.

However, in these polyester resins, during melt molding, thermal degradation or hydrolysis occurs, leading to reduction in a molecular weight. In particular, when polyester resins are not sufficiently dried, since this reduction in a molecular weight is remarkable, there is a problem that mechanical physical property of products is considerably deteriorated.

Further, in the case of direct blow molding, since this reduction in a molecular weight makes drawdown phenomenon remarkable, and nonuniformity of wall thickness and burr become large, the ratio of the article that meets standard specifications is reduced. At the same time, since the parison forming state is not stabilized, continuous production stability is also reduced. In addition, since mechanical physical property such as impact resistance of a molded article is reduced, a bottle strength at filling contents into a bottle container is deficient, a bottle is bursted at falling, and contents are flown out.

In recant years, a PET bottle is used at a large amount in various refreshing drink fields such as mineral water and the like. On the other hand, accompanying therewith, a problem of disposal of the PET bottle is given an attention, and PET bottle scrap treatment has become a social problem. Under such the situation, recycling of used PET bottles is being studied intensively.

For recycling PET bottles, used PET bottles are recovered, ground, and washed to obtain a reproduced PET flake, and there are the case where a product is molded using this as a raw material, and the case where this is once pelletized by melt extrusion, and a product is molded from this pellet via melt molding.

Since this reproduced PET flake is reduced in a molecular weight by heat, contains a large amount of water by a washing step, and is worse as for biting property on a screw of a molding machine due to the flaky form, the flake is difficult to mold and, only by the reproduced PET flake, only a brittle product having unstable quality is obtained. In addition, since PET usually is hydrolyzed easily and, when molded in the undried state, hydrolysis is promoted, and a molecular weight is reduced at melting, mechanical physical property such as impact resistance is considerably reduced. Therefore, a molded article using the reproduced PET flake does not satisfy performance required in usual plastic products in many cases.

Previously, as study on improvement in impact resistance, a method of melt molding by blending an impact resistance modifier into a polyester has been known. An effective impact resistance modifier for a polyester is known in Japanese Patent Publication No. 59-28223 gazette. In the gazette, a rubber-like polymer obtained by grafting or copolymerizing with a compound having a functional group capable of chemically reacting with a polyester is used. Particularly effective impact resistance modifier is an olefin-based or a styrene block polymer-based polymer. In addition, Japanese Patent Laying-Open No. 11-269360 shows that, by blending a polytetrafluoroethylene-containing powder consisting of polytetrafluoroethylene and an organic polymer into a polyester resin, drawdown at molding is improved. Japanese Patent Laying-Open No. 2001-2903 shows that, by blending a multilayered structure particle consisting of a rubber-based component into a polyester resin, impact resistance of a polyester resin molded article produced from a reproduced PET flake is improved. Japanese Patent Laying-Open No. 2001-114995 shows that, by blending polypropylene, and an ethylene-based or styrene-based polymer modified with unsaturated carboxylic acid into a polyester resin, impact resistance is improved. Japanese Patent Laying-Open Nos. 2002-146167 and 2002-249649 show that, by blending a thickener (rubber-based resin) and a high-molecularizing agent (ethylene-based or styrene-based elastomer) into a polyester resin, impact resistance is improved.

In case that the impact resistance modifier and the polyester resin are kneaded as mentioned above, reduction in a molecular weight due to re-extrusion progresses further. So improvement in impact resistance by addition of a small amount of an impact resistance modifier is not sufficient. In addition, since this is addition of a heterogeneous polymer, transparency originally possessed by a polyester resin is inhibited due to a difference in refractive indices. Therefore, under such the circumstances, impact resistance is improved at the cost of transparency.

Japanese Patent Laying-Open No. 2000-355657 shows that, by blending a polymer composed of a vinyl polymer in a thermoplastic resin, particularly, a polyester resin, flowability is improved while maintaining transparency. In this case, there remains a problem that, even when applied to a polyester resin, transparency can be maintained, but it is, difficult to suppress reduction in a molecular weight, and impact resistance can not be improved.

In blow extrusion, an agent with reactive functional groups for increasing melt strength, whose weight average molecular weight is 1 million to 4 millions, is proposed as a reactive melt strength improving agent (Japanese Patent No. 3237913). However, in this kind of agent for increasing melt strength, since a vinyl-based aromatic modifier having an extremely high molecular weight must be dispersed in a polyester resin, it is necessary to thoroughly adjust its blending amount and processing condition. For example, in order to attain an objective melt strength, processing condition is limited to a narrow range and, when departed from this condition, a melt strength is greatly varied. In addition, probably due to poor compatibility between an agent for increasing melt strength and a polyester resin, there is problem that even at slight bending at application of this molded article, voids are generated, and this part is whitened.

As described above, a modifier which inhibits reduction in physical property due to reduction in a molecular weight and, at the same time, can maintain transparency while impact resistance is improved, for a polyester resin, has been sought, but such the modifier has not been proposed yet.

DISCLOSURE OF THE INVENTION

Problems to be Solved by the Invention

An object of the present invention is to provide a modifier which improves moldability in melt molding, particularly, injection molding, extrusion molding, profile molding, direct blow molding, and calendar processing molding using a polyester resin and, moreover, can improve mechanical physical property while maintaining transparency, and provide a polyester molded article using the modifier.

Means for Solving the Problems

In order to attain the above object, the present inventors intensively studied and, as a result, found out that all of the above problems can be solved by kneading in advance an amorphous polyester (I) and a reactive compound (II) containing two or more glycidyl groups and/or isocyanate groups per one molecule and having a weight average molecular weight of not less than 200 and not more than 500 thousands to react a part of them to obtain a modifier and, then, blending the modifier into an amorphous polyester resin (II) and/or a crystalline polyester resin (IV) to mold this, which resulted in completion of the present invention. That is, the present invention is the following modifier for a polyester resin, and a process for producing a polyester molded article using this.

A first invention is a modifier for a polyester resin, containing an amorphous polyester resin (I), and a reactive compound (II) containing 2 or more glycidyl groups and/or isocyanate groups per one molecule and having a weight average molecular weight of not less than 200 and not more than 500 thousands.

A second invention is a polyester resin composition, containing an amorphous polyester resin (I), a reactive compound (II) containing 2 or more glycidyl groups and/or isocyanate groups per one molecule and having a weight average molecular weight of not less than 200 and not more than 500 thousands, and an amorphous polyester resin (III).

A third invention is a polyester resin composition, containing an amorphous polyester resin (I), a reactive compound (II) containing 2 or more glycidyl groups and/or isocyanate groups per one molecule and having a weight average molecular weight of not less than 200 and not more than 500 thousands, and a crystalline polyester resin (IV).

A fourth invention is a process for producing a mold article, including mixing a modifier containing an amorphous polyester resin (I), and a reactive compound (II) containing two, or more glycidyl groups and/or isocyanate groups per one molecule and having a weight average molecular weight of not less than 200 and not more than 500 thousands into an amorphous polyester (III) and/or a crystalline polyester resin (I), followed by melt molding.

Effects of the Invention

By blending the modifier of the present invention into a polyester resin, moldability in melt molding, particularly, injection molding, T die extrusion molding, profile molding, direct blow molding, and calendar processing molding can be improved, and a polyester resin molded article having excellent transparency and mechanical physical property can be obtained.

The modifier for a polyester resin of the present invention contains an amorphous polyester (I) and a reactive compound (II) containing two or more glycidyl groups and/or isocyanate groups per one molecule and having a weight average molecular weight of not less than 200 and not more than 500 thousands and, by mixing this modifier and an amorphous polyester resin (III) and/or a crystalline polyester resin (IV) to perform the aforementioned molding, excellent property can be imparted to a molded article.

That is, in this formulation, since when molecular weights before molding and after molding are compared, a molecular weight of a resin is increased after molding, it becomes possible to prevent reduction in a molecular weight at melt molding. Further, since compatibility between polyester resins is better, mechanical physical property such as impact resistance of a molded article can be improved. Simultaneously, since this is the same kind of a polyester-based material blended system, transparency originally possessed by at polyester resin can be retained.

For example, in the case of profile molding, drawdown of a resin discharged from a die is prevented and, at the same time, "a problem that a discharged resin via an extrusion step and a profile die step is adhered to a sizing die, resin choking is generated, and continuous production is stopped", "a problem that a dimensional precision of a product shape is deteriorated in a sizing step", "a problem that a chatter mark (a streak parallel with a progression direction) is generated on a surface of a molded article due to resin melting property in a sizing die", "a problem that product warpage is generated relative to a profile molding progression direction" and the like can be improved.

In addition, in the case of direct blow molding, since a melt viscosity is increased to improve drawdown, the parison shape state is stabilized, and continuous production stability is improved. In addition, mechanical physical property such as impact resistance of a molded article becomes better. As a result, a bottle strength when contents are filled in a bottle container is improved, and a problem of flying out of contents due to burst at falling is improved.

Further, in the case of calendar molding, since a melt viscosity is increased to improve drawdown, processibility is considerably improved, and requirement property such as a product dimension, and a gloss and the like can be satisfied. In addition, since a melt tension of a resin is elevated, a resin becomes difficult to be adhered to a roll, and a problem that a resin is elongated by a pulling tension can be overcome.

BEST MODES FOR CARRYING OUT THE INVENTION

An amorphous polyester referred in the present invention refers to a polyester not showing a clear melting peak in both temperature raising processes in a two times temperature raising process of raising a temperature from −100° C. to 300° C. at 20° C./min, then, lowering a temperature to −100° C. at 50° C./min, and subsequently, raising a temperature from −100° C. to 300° C. at 20° C./min. Conversely, a crystalline polyester refers to a polyester showing a melting peak in any of two temperature raising processes.

As amorphous polyester resins (I) and (III) used in the present invention, any can be used as far as it consists of a dicarboxylic acid component and a glycol component.

As amorphous polyester resins (I) and (III) used in the present invention, it is desirable that resins have, as a main component, aromatic dicarboxylic acid of a carbon number of 8 to 14 and aliphatic or alicyclic glycol of a carbon number of 2 to 10. A main component used herein means that, letting a total acid component and a glycol component to be 100 mole %, respectively, both components are not less than 50 mole %, preferably not less than 60 mole %, further preferably not less than 65 mole %, respectively. When both components are less than 50 mole %, elongation and mechanical physical property of a molded article are reduced in some cases.

Furthermore, it is desirable that, among amorphous polyester resins (I) and (III), aromatic dicarboxylic acid of a carbon number of 8 to 14 is terephthalic acid and/or isophthalic acid. When these dicarboxylic acids are used, elongation and mechanical physical property of a molded article are further improved. Terephthalic acid is preferably not less than 50 mole %, further preferably not less than 60 mole %, and it is also preferable that both of terephthalic acid and isophthalic acid are contained.

As amorphous polyester resins (I) and (III), polyvalent carboxylic acid other than the terephthalic acid and isophthalic acid may be copolymerized and, for example, the known polyvalent carboxylic acid such as orthophthalic acid, naphthalenedicarboxylic acid, succinic acid, adipic acid, azelaic acid, sebacic acid, decanoic acid, dimer acid, cyclohexandicarboxylic acid, trimellitic acid and the like can be used.

It is preferable that amorphous polyester resins (I) and (III) used in the present invention contain, as a main component, aliphatic or alicyclic glycol of a carbon number of 2 to 10. It is preferable from a viewpoint of generality and cost of obtaining a raw material, and a mechanical and physical property of a molding article that the aliphatic or alicyclic glycol of a carbon number of 2 to 10 is at least one kind of more selected from the group consisting of ethylene glycol, diethylene glycol, neopentyl glycol, cyclohexanedimethanol, 1,2-propanediol, 1,3-propanediol, and 2-methyl-1,3-propanediol.

Among them, a combination of ethylene glycol and neopentyl glycol (60/40 to 90/10 (mole ratio)), ethylene glycol and 1,4-cyclohexanedimethanol (60/40 to 90/10 (mole ratio)), or ethylene glycol and 1,2-propanediol (90/10 to 10/90 (mole ratio)) easily realizes both of melt molding processibility and transparency of a molded article.

Amorphous polyester resins (I) and (III) may be such that a polyhydric alcohol component other than the aforementioned ethylene glycol, diethylene glycol, neopentyl glycol, cyclohexanedimethanol, 1,3-propanediol, and 2-methyl-1,3-propanediol may be copolymerized and, for example, 1,2-butanediol, 1,3-butanediol, 1,4-butanediol, 1,5-pentanediol, 3-methyl-1,5-pentanediol, hexanediol, nonanediol, dimerdiol, or an ethylene oxide adduct or a propylene oxide adduct of bisphenol A, polyethylene glycol, polypropylene glycol, polytetramethylene glycol, 2-butyl-2-ethyl-1,3-propanediol, tricyclodecanedimethanol, neopentylhydroxypivalic acid ester, 2,2,4-trimethyl-1,5-pentanediol, trimethylolpropane and the like can be used.

It is preferable from a viewpoint of promotion in moldability that amorphous polyester resins (I) and (III) used in the present invention contain, as a monomer component, a polyfunctional compound having three or more carboxyl groups and/or hydroxyl groups (e.g. trimellitic acid, pyromellitic acid, glycerin, trimnethylolpropane etc.) at 0.001 to 5 mole % of an acid component and/or a glycol component of a polyester, respectively.

A reduced viscosity of amorphous polyester resins (I) and (III) used in the present invention is preferably 0.40 to 1.50 dl/g, more preferably 0.50 to 1.20 dl/g, further preferably 0.60 to 1.00 dl/g. When a reduced viscosity is less than 0.40 dl/g, a strength and elongation of a molded article are deficient due to deficiency in a resin aggregating force, thus, a resin becomes brittle, and the resin can not be used. On the other hand, when a reduced viscosity exceeds 1.50 dl/g, since a melt viscosity becomes too high, an optimal temperature for molding is also raised and, consequently, there is a possibility that molding processibility is deteriorated.

An acid value of amorphous polyester resins (I) an (III) used in the present invention is preferably not more than 100 equivalent/$10^6$ g, more preferably not more than 50 equivalent/$10^6$ g, further preferably not more than 40 equivalent/$10^6$ g. On the other hand, as a lower limit is lower, it is better. When an acid value exceeds 100 equivalent/$10^6$ g, hydrolysis is promoted upon heating of a resin at a melting processing, and a mechanical strength of a finished molded article is reduced.

Compositions of an amorphous polyester resin (I) and an amorphous polyester resin (III) may be the same or different, and when compositions are different, it becomes easy to control reactivity between a reactive compound (II) and an amorphous polyester.

As a crystalline polyester resin (IV) referred in the present invention, any can be used as far as it consists of a dicarboxylic acid component and a glycol component. Alternatively, oxycarboxylic acid may be used. Particularly, polyethylene terephthalate (PET), polybutylene terephthalate (PBT) or a polylactic acid resin is preferable, and a most effective crystalline polyester is reproduced polyethylene terephthalate (PET).

As lactic acid used as a raw material of the polylactic acid resin, any of L-lactic acid and D-lactic acid can be used. Alternatively, L-lactide, D-lactide or DL-lactide may be used. A molecular weight can be arbitrarily adjusted by varying a time and a temperature of polymerizing the polyester, or a degree of a reduced pressure at polymerization (in the case of reduced pressure polymerization), or varying a use amount of a polyalcohol component to be copolymerized described later.

For controlling other properties, a polylactic acid resin used in the present invention may be copolymerized with oxyacid such as glycolic acid, malic acid, citric acid, gluconic acid, 3-hydroxybutyric acid, 4-hydroxybutyric acid and the like, lactones such as caprolactone, valerolactone, butyrolactone and the like, aliphatic dibasic acid such as succinic acid, adipic acid, sebacic acid, and azelaic acid, aliphatic glycols such as ethylene glycol, diethylene glycol, neopentyl glycol, propylene glycol, 1,4-butanedoil, 1,6-hexanediol, 1,9-nonanediol and the like, glycerin, polyglycerin or the like in addition to lactic acid, being not limited to these copolymerization components. In addition, aromatic dicarboxylic acid such as terephthalic acid, isophthalic acid, orthophthalic acid and the like, or aromatic diol such as bisphenol A, and an alkylene oxide adduct of bisphenol A may be copolymerized at a small amount, but from a viewpoint of biodegradability, it is preferable that they are not contained. It is preferable that an amount of other monomer to be copolymerized is less than 30 mole %, letting a total amount of lactic acid and other monomer to be 100 mole %.

A content of an amorphous polyester resin (I) in the modifier of the present invention, letting a whole modifier to be 100% by weight, is preferably not less than 20% by weight and not more than 99.5% by weight, and it is more preferable that a lower limit is not less than 30% by weight, and an upper limit is not more than 98% by weight. When the content exceeds 99.5% by weight, the effect of improving mechanical physical property such as impact resistance, and a melt strength is not manifested in some cases and, when the content is less than 20% by weight, transparency of a molded article is reduced in some cases.

A reactive compound (II) used in the modifier of the present invention has desirably a weight average molecular weight of not less than 200 and not more than 500 thousands in order to manifest the "melt strength potentiating effect" by reacting with a polyester resin to increase a molecular weight, and extend a processing condition administration width and control so that a melt strength can be adjusted and, further, satisfy suppression of bending resistance whitening of a product and bleeding out of unreacted materials onto a superficial layer of a product. A lower limit is preferably not less than 500, more preferably not less than 700, most preferably not less than 1000. On the other hand, an upper limit is preferably not more than 300 thousands, more preferably not more than 100 thousands, most preferably not more than 50 thousands. When a weight average molecular weight of a reactive compound is less than 200, an unreacted reactive compound is bled out on a surface of a product, and there is a possibility that this reduces printability and adherability on a product, and causes pollution of a surface. On the other hand, when a weight average molecular weight exceeds 500 thousands, upon bending, probably due to poor compatibility between a reactive compound and a polyester, there is a greater possibility that voids are generated, and bending whitening occurs.

It is preferable that a reactive compound (II) used in the present invention has two or more functional groups capable of reacting with a hydroxyl group or a carboxyl group possessed by a polyester per one molecule. When a reaction product between a hydroxyl group or a carboxyl group possessed by a polyester, and a reactive compound is produced at melt extrusion, the effect of improving a melt strength can be obtained by formation of a partial crosslinked product.

Examples of a functional group possessed by a reactive compound (II) include a glycidyl group and an isocyanate group from a viewpoint of a reaction rate. Alternatively, in addition to them, a functional group such as a carboxyl group, a carboxylic acid metal salt, an ester group, a hydroxyl group, an amino group, a carbodiimide group, a glycidyl group and the like, or a functional group which generates ring-opening addition with a polyester terminal such as lactone, lactide, lactam and the like may be contained.

As a form of a functional group in a reactive compound (II), any is possible. For example, a functional group may be present on a main chain of a polymer, a functional group may be present on a side chain, or a functional group may be present on a terminus. Examples include a styrene/methyl methacrylate/glycidyl methacrylate copolymer, an epoxy-based compound of a bisphenol A type, cresol novolak, or phenol novolak type, an isocyanate-based compound and the like, and any of them may be used, and these may be, of course, used by mixing them.

Particularly, as the aforementioned reactive compound (II), a copolymer comprising (X) 20 to 99% by weight of a vinyl aromatic monomer, (Y) 1 to 80% by weight of hydroxyalkyl (meth) acrylate and/or glycidylalkyl (meth)acrylate, and (Z) 0 to 40% by weight of alkyl (meth)acrylate is preferable. Further preferable is a resin comprising 25 to 90% by weight of (X), 10 to 75% by weight of (Y), and 0 to 35% by weight of (Z), and most preferable is a resin consisting of 30 to 85% by weight of (X), 15 to 70% by weight of (Y), and 0 to 30% by weight of (Z). Since a composition of them influences on a content of a functional group contributing to a reaction with a polyester resin (I), (III) or (IV), appropriate adjustment is necessary as described above. When outside the aforementioned composition, there is a possibility that reactivity with a polyester resin is reduced, and molding processibility is reduced. In addition, a lower limit of (Z) is preferably not less than 5% by weight.

In the present invention, as a reactive compound (II), a reactive compound having a glycidyl group is preferable. In that case, an epoxy value is preferably 800 equivalent/$10^6$ g to 3000 equivalent/$10^6$ g, further preferably 1000 equivalent/$10^6$ g to 2800 equivalent/$10^6$ g, most preferably 1200 equivalent/$10^6$ g to 2500 equivalent/$10^6$ g. When an epoxy value is less than 800 equivalent/$10^6$ g, goal impact resistance is not manifested in some cases and, when an epoxy value exceeds 3000 equivalent/$10^6$ g, the viscosity increasing effect becomes excessive, and this adversely effects on moldability in some cases.

An amount of a reactive compound (II) to be added can be individually selected depending on a molecular weight and the number of functional groups to be introduced and, letting a whole modifier to be 100% by weight, is preferably not less than 0.5% by weight ant not more than 80% by weight, and it is more preferable that a lower limit is not less than 1% by weight, and an upper limit is not more than 70% by weight. When the amount is less than 0.5% by weight, goal mold moldability effect is not manifested in some cases and, when the reactive compound is added at an amount exceeding 80% by weight, this influences on mechanical property of a product in some cases. In addition, letting a whole composition of an amorphous polyester (I), a reactive compound (II), an amorphous polyester (III) and/or a crystalline polyester (IV) to be 100 parts by weight, it is preferable that a reactive compound (II) is not less than 0.1% by weight and not more than 20% by weight, and it is more preferable that a lower limit is not less than 0.5% by weight, and an upper limit is not more than 15% by weight. When the amount is less than 0.1% by weight, goal impact resistance is not manifested in some cases and, when added in an amount exceeding 20% by weight, this influences on mechanical property of a product in some cases.

Regarding a method of adding a reactive compound (II) to an amorphous polyester resin (I) upon production of the modifier of the present invention, a method of pressing into a polyester resin (I) at melt extrusion, a method of adding to a pellet of a polyester resin (I) before processing, and blending to perform melt kneading, a method of adding to and kneading with a polyester resin (I) once, and extruding this again, and the like are contemplated and, particularly, a method of adding to a pellet of a polyester resin (I) before processing, and blending to perform melt kneading is preferable. It is preferable that a modifier is pelletized from a viewpoint of convenience when melt-kneaded with an amorphous polyester resin (III), and a crystalline polyester resin (IV) at a later step.

In the present invention, by melt-kneading the aforementioned modifier with an amorphous polyester resin (III) and/or a crystalline polyester resin (IV), a molded article excellent in mechanical property can be produced. Examples of a molding method include injection molding, extrusion molding, profile molding, injection blow molding, direct blow molding, blow compression molding, stretching blow molding, calendar molding, thermal molding (including vacuum or pressure molding), reaction injection molding, expansion molding, compression molding, powder molding (including rotation or stretching molding), lamination molding, casting, melt spinning and the like. Among them, from a viewpoint of maximum exhibition of the effect of the present invention of improvement in moldability, and improvement in mechanical physical property while maintaining transparency in a mold article, it is preferable to produce a molded article by injection molding, extrusion molding, profile molding, direct blow molding, or calendar processing molding.

By molding by blending the modifier of the present invention into an amorphous polyester resin (III) and/or a crystalline polyester resin (IV) to perform melt kneading, improvement in moldability, and improvement in mechanical physical property while maintaining transparency can be realized. If an amorphous polyester resin (I) and a reactive compound (II), and an amorphous resin (III) and/or a crystalline polyester resin (IV) are dry-blended (pellets are mixed, the same hereinafter), a blend is placed into a hopper of an molding machine such as an extrusion machine and the like, and this is melt-kneaded and molded as it is, there is a remarkable tendency that a viscosity of a melt is increased, control is difficult and, in the worst case, the material is gelled at melting (for example, in an extrusion machine) in some cases. In addition, when there is a remarkable tendency that a viscosity of a melt is increased, it is difficult to change the optimal condition at a molding field, and molding conversely becomes difficult. To the contrary, when the modifier of the present invention is produced in advance, only by blending this and an amorphous polyester resin (III) and/or a crystalline polyester resin (IV) at a molding field, and adjusting a blending ratio while the molded state is confirmed, the optimal molding condition can be simply selected.

As the temperature condition when an amorphous polyester resin (III) and/or a crystalline polyester resin (IV) and the modifier of the present invention are melt-molded, any temperature is not problematic as far as the temperature is in such a range that the modifier, and an amorphous polyester resin (III) and/or a crystalline polyester resin (IV) can be melt-flown. From a viewpoint of a nature of a polyester resin, a temperature is thought to be not lower than 100° C. and not higher than 350° C., and more preferably, not lower than 150° C. and not higher than 300° C. suitable. When a temperature is too low, a polymer can not be supplied, and an excessive load is applied to an extruder and, conversely, when a temperature is too high, a polymer is thermally deteriorated, being not preferable. A discharge amount, and other condition are appropriately adjusted depending on a molding machine.

A melt viscosity at 220° C. and a shearing rate of 100 sec$^{-1}$, of a resin composition consisting of the modifier of the present invention, and an amorphous polyester (III) and/or a crystalline polyester resin (IV) is preferably 6000 to 600000 dPa·sec, more preferably 7000 to 100000 dPa·sec, further preferably 8000 to 50000 dPa·sec. When a melt viscosity is less than 6000 dPa·sec, processibility at melt processing is deteriorated in some cases. On the other hand, when a melt viscosity exceeds 600000 dPa·sec, a melt viscosity is too high, and productivity is deteriorated, being not practical in some cases.

It is desirable to blend an antioxidant to the modifier of the present invention, or a resin composition of the modifier and an amorphous polyester (III) and/or a crystalline polyester (IV) and, thereafter, using this in order to suppress thermal degradation of a polyester resin at molding (prevent coloration of a resin and occurrence of resin sagging due to thermal deterioration). As the antioxidant, for example, a phenol-based antioxidant, an organic phosphorous acid ester-based compound or the like is preferable.

In the present invention, in order to improve heat resistance, impact resistance, dimensional stability, surface smoothness, rigidity and other mechanical property of a modifier or a resin composition, a resin other than polyester resins (I), (II) and (IV) may be added.

When calendar processing molding is performed using the modifier of the present invention, and an amorphous polyester resin (III) and/or a crystalline polyester resin (IV), in order to improve roll releaseability, a glidant may be blended. Thereupon, an amount of a glidant to be blended is preferably 0.01 to 5 parts by weight. A further preferable lower limit is 0.05 part by weight, a more preferable lower limit is 0.1 part by weight, and a most preferable lower limit is 0.5 part by weight. In addition, a further preferable upper limit is 4.5 parts by weight, a more preferable upper limit is 4 parts by weight, and a most preferable upper limit is 3.5 parts by weight. When an amount of a glidant is less than 0.01 part by weight, it is difficult to obtain the effect of improving roll releaseability and, when the amount exceeds 5 parts by weight, there is a tendency that transparency, coloring and printability of a sheet obtained by processing are deteriorated.

The glidant is not particularly limited, but includes a polyolefin-based wax, an organic phosphoric acid ester metal salt, an organic phosphoric acid ester, an ester compound of adipic acid or azelaic acid and a higher fatty alcohol, aliphatic amide such as ethylenebisstearic acid amide, methylenebisstearic acid amide, and ethylenebisoleic acid amide, glycerin higher fatty acid ester compound, higher fatty alcohol, higher fatty acid, paraffin derived from a petroleum or a coal, a wax, a natural or synthetic high-molecular ester wax, a metal soap of higher fatty acid, and the like. One kind or two kinds of them may be used.

In the present invention, other components may be appropriately added to a modifier, and a resin composition consisting of the modifier, and an amorphous polyester resin (III) and/or a crystalline polyester resin (IV) depending on utility thereof. Examples include an impact resistance improving agent, a filler, an ultraviolet absorbing agent, a surface treating agent, a glidant, an optical stabilizer, a pigment, an antistatic agent, an antibacterial agent, a crosslinking agent, a sulfur-based antioxidant, a flame-retardant, a plasticizer, a processing aid, an expanding agent and the like.

EXAMPLES

In order to illustrate the present invention in more detail, examples are provided below, but the present invention is not limited to these examples at all. Measured values described in synthesis examples were measured according to the following methods.

Weight average molecular weight: GPC measurement was performed at a flow rate of 1 ml/min and a column temperature of 35° C. using gel permeation chromatography (GPC) 150 c manufactured by Waters employing tetrahydrofuran as an eluent and, by calculation from results, a measured value in terms of polystyrene was obtained. As a column, shodex KF-802, 804, and 806 manufactured by SHOWA DENKO K.K. was used.

Resin composition: A composition of an amorphous polyester resin was obtained by performing $^1$H-NMR analysis using nuclear resonance analyzer (NMR) Gemini 200 manufactured by Varian in a chloroform-D solvent, and determining a composition from, an integrated ratio.

Glass transition temperature, melting point: 5 mg of a sample was placed into an aluminum sample pan, this was sealed, measurement was performed by heating to 200° C. at a temperature raising rate of 20° C./min using a differential scanning calorimeter (DSC) DSC-220 manufactured by Seiko Instruments, and a maximum peak temperature of a melting heat was obtained as a crystal melting point. A glass transition temperature was obtained as a temperature at an intersection between an extension line of a baseline below a glass transition temperature and a tangential line showing a maximum inclination at a transition part.

Acid value: An acid value was obtained by dissolving 1 g of a resin in 30 ml of chloroform, and performing titration with a 0.1N solution of potassium hydroxide in ethanol. As an indicator, phenolphthalein was used.

Reduced viscosity: A reduced viscosity was obtained by dissolving 0.1 g of a sample in 25 ml of a mixed solvent of phenol/tetrachloroethane (weight ratio 6/4), and measuring a reduced viscosity at 30° C. using an Ubbellohde viscometer. An unit is in dl/g.

Epoxy value: A sample was weighed in a 100 ml Erlenmeyer flask, 10 ml of methylene chloride was added, and this was stirred with a magnetic stirrer to dissolve the sample. 10 ml of a tetraethylammonium bromide reagent was added, 6 to 8 droplets of a crystal violet indicator were added, and this was titrated with 0.1N perchloric acid. As an endpoint, a point at which the state is stable for 2 minutes after a color turned from blue into green was adopted. An amount (ml) of perchloric acid necessary for titration was read, and an epoxy value was calculated according to the following calculation equation.

Epoxy value (equivalent/$10^6$ g)=(N×A×1000)/W

W: weight (g) of sample
A: amount (ml) of perchloric acid necessary for titration
N: normality of perchloric acid reagent Synthesis Example of Amorphous Polyester (A)

960 parts by weight of dimethyl terephthalate, 527 parts by weight of ethylene glycol, 156 parts by weight of neopentyl glycol, and 0.34 part by weight of tetrabutyl titanate were added to a reactor equipped with a stirrer, a thermometer, and a condenser for flowing out, and a transesterification reaction was performed at 170 to 220° C. for 2 hours. After completion of a transesterification reaction, a temperature of a reaction system was raised from 220° C. to 270° C., while a pressure in a system was slowly reduced to 500 Pa over 60 minutes. And, a polycondensation reaction was performed at 130 Pa or lower for 55 minutes to obtain an amorphous polyester (A).

As a result of NMR analysis, an amorphous polyester resin (A) had a composition of a dicarboxylic acid component of 100 mole % of terephthalic acid, and a diol component of 70 mole % of ethylene glycol, and 30 mole % of neopentyl glycol. In addition, a glass transition temperature was 78° C., a number average molecular weight was 28000, a reduced viscosity was 0.81 dl/g, and an acid value was 30 equivalent/$10^6$ g.

Amorphous polyester resins (B) to (F), and a crystalline polyester (H) were produced as in the amorphous polyester (A). A composition, and measurement results are shown in Table 1 (a numerical value is mole % in a resin).

TABLE 1

|  |  | Polyester | | | | | | |
|---|---|---|---|---|---|---|---|---|
|  |  | A | B | C | D | E | F | G |
| Acid | Terephthalic acid | 100 | 100 | 51 | 100 | 99.9 | 99.85 | 65 |
|  | Isophthalic acid |  |  | 49 |  |  |  |  |
|  | Adipic acid |  |  |  |  |  |  | 35 |
|  | Trimellitic anhydride |  |  |  |  | 0.1 | 0.15 |  |
| Glycol | Ethylene glycol | 70 | 71 | 49 | 27 | 69 | 67.7 | 35 |
|  | Neopentyl glycol | 30 |  | 51 |  |  |  |  |
|  | 1,2-propanediol |  |  |  | 73 |  |  |  |
|  | Cyclohexanedimethanol |  | 29 |  |  | 31 | 32 |  |
|  | Diethylene glycol |  |  |  |  |  | 0.3 |  |
|  | 1,4-Butanediol |  |  |  |  |  |  | 64 |
|  | Polytetramethylene glycol (Number average molecular weight 1000) |  |  |  |  |  |  | 1 |
| Physical property | Reduced viscosity (dl/g) | 0.81 | 0.85 | 0.58 | 0.60 | 0.81 | 0.85 | 0.80 |
|  | Glass transition temperature (° C.) | 78 | 78 | 57 | 85 | 75 | 78 | −6 |
|  | Melting point (° C.) | — | — | — | — | — | — | 160 |
|  | Acid value (equivalent/$10^6$g) | 30 | 25 | 26 | 40 | 20 | 25 | 28 |

<Reproduced PET Flake>
A YPR flake manufactured by Yono PET Bottle Recycle was used.

<Polylactic Acid>
LACIA H-400 manufactured by Mitsui Chemicals, Inc. was used.

<Synthesis Example of Reactive Compound (I)>
50 parts of methyl ethyl ketone was placed into a reactor equipped with a stirrer, a refluxing equipment and two quantitative adding devices, a temperature was raised to 70° C., a mixture of 36.4 parts by weight of styrene, 37.3 parts by weight of glycidyl methacrylate, and 26.3 parts by weight of methyl methacrylate, and a solution obtained by dissolving 2 parts of azobisdimethylvaleronitrile in 50 parts of methyl ethyl ketone were added dropwise to a reactor simultaneously at 1.2 ml/min and, also after completion of addition, stirring was continued for further 2 hours. Thereafter, by reducing a pressure, methyl ethyl ketone was removed from the reaction mixture to obtain a reactive compound (I).

As a result of NMR analysis, this reactive compound (I) had a composition of a monomer component of 36 parts by weight of styrene, and a 38 parts by weight of glycidyl methacrylate, and 26 parts by weight of methyl methacrylate. In addition, a glass transition temperature was 50° C., and a weight average molecular weight was 25000. An epoxy value was 2627 equivalent/$10^6$ g.

Synthesis Example of Reactive Compound (J)

The compound was produced by emulsion polymerization in a reactor equipped with a stirrer, a cooler and a heating device. A reactor was first charged with a solution consisting of 900 parts by weight of deionized water, 0.2 part by weight of acetic acid, 0.005 part by weight of $FeSO_4$, and 0.06 part by weight of sodium ethylenediaminetetraacetate dihydrate. The solution was heated to 75° C. under the nitrogen atmosphere. A solution obtained by emulsifying 182 parts by weight of styrene, 48.4 parts by weight of glycidyl methacrylate, and 25.8 parts by weight of a butyl methacrylate monomer using 2.7 parts by weight of sodium dodecylbenzenesulfonate at 75° C. was added, and 0.22 part by weight of sodium persulfate as an initiator was added. Then, a reaction progressed until 99.9% or more of the monomer was replaced by investigation of a solid matter content. After completion of the reaction, an emulsion was cooled to room temperature and, then, this was spraying-dried to obtain a white powder.

As a result of NMR analysis, this reactive compound (J) had a composition of a monomer component of 71% by weight of styrene, 19% by weight of glycidyl methacrylate, and 10% by weight of butyl methacrylate. In addition, a glass transition temperature was 55° C., and a weight average molecular weight was 10000. An epoxy value was 1330 equivalent/$10^6$ g.

Synthesis Example of Reactive Compound (K)

The compound was synthesized by the same method as that of the reactive compound (I) and, as a result of NMR analysis, the compound had a composition of a monomer component of 69% by weight of a styrene, 5% by weight of glycidyl methacrylate, and 26% by weight of butyl methacrylate. In addition, a weight average molecular weight was 300 thousands.

Example 1

90% by weight of an amorphous polyester resin (A), 10% by weight of a reactive compound (I), 1.0 part by weight of bis[S-(4-tert-butyl-3-hydroxy-2,6-dimethylbenzyl)]thioterephthalate, and 0.33 part by weight of glycerin monostearic acid ester were mixed, the mixture was melted and kneaded with an extruder (L/D=30, screw diameter=20 mm, full flight, compression ratio 2.0) set at a rotation number of 30 rpm, and a whole barrel temperature of 220° C., extruded into a string through a nozzle, cooled in water, cut with a cutter, and pelletized to obtain a modifier for a polyester resin.
(Evaluation by Injection Molding)

30 parts by weight of the modifier for a polyester resin and 70 parts by weight of an amorphous polyester (B) were dry-blended, and a test piece for a physical property test was molded with an injection molding machine (Toshiba IS-100E: mold locking force 100 ton) under the condition of a cylinder temperature of 230° C., a mold temperature of 30° C., and a rear pressure of 20 kg/cm². This was used to perform evaluation by the following methods. Results are shown in Table 2. Tendency of increase and decrease in reduced viscosity:

⊚: Increase in reduced viscosity by 15% or more
○: Absence of increase or degrease in reduced viscosity
X: Reduction in reduced viscosity Impact resistance test: Izod with notch impact strength (ASTM D-256) test temperature 23° C.
○: Not less than 40 J/m
Δ: Not less than 25 J/m and less than 40 J/m
X: Less than 25 J/m Transparency: A sample was press-molded into a plate having a thickness of 1 mm, and transparency thereof was judged with naked eyes.
○: Extremely transparent
X: Inferior in transparency
(Evaluation by Profile Molding)

Figure 1:
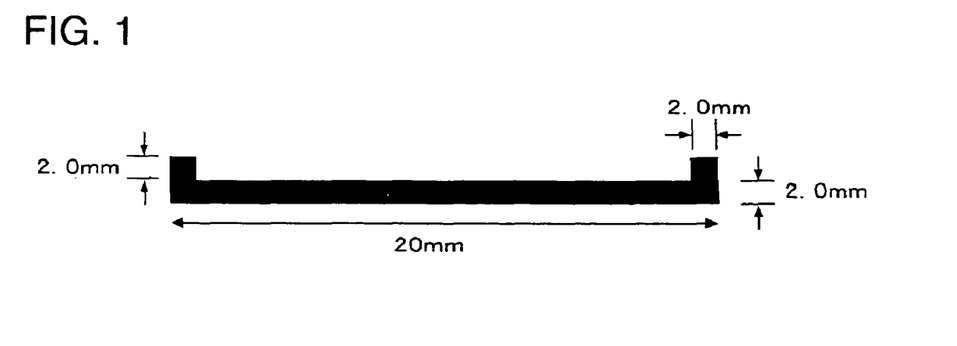
FIG. 1 is a cross-sectional view of a profile molded article.

30 parts by weight of the modifier for a polyester resin and 70 parts by weight of an amorphous polyester (B) were dry-blended, a cylinder temperature was set at 210° C., a dye lip for producing a molded article shown in FIG. 1 was attached to a monoaxial extruder (L/D=25, full flight screw, screw diameter 65 mm), then, a sizing die for deciding a final dimension of a profile extrusion product was attached to a tip of a cooling water bath, and the blend was molded with profile molding facilities equipped with a pulling machine through a water bath. This was used to perform evaluation by the following method. Results are shown in Table 2.

Situation of sizing die processing (continuous productivity):
○: A resin was not adhered in a sizing die, processability was smooth, and an edge shape precision of a molded article between die and sizing dies was high.
X: Resin adhesion was generated in a sizing die, and a step could not be transferred to a sizing step. Alternatively, processability was worse in a sizing step, an edge precision of a molded article was low, and continuous productivity was deteriorated.
Product Dimensional Precision:
○: The same as designed value.
Δ: A slippage was generated in a range of less than 0.3 mm from a designed value.
X: A slippage of not less than 0.3 mm from a designed value was generated.
Surface smoothness: The irregular state of an outer surface of a molded article was measured using an ultradeep surface shape measuring microscope (VK-8500 manufactured by Keyence).
○: A maximum height of an irregular plane was less than 100 μm.
Δ: A maximum height of an irregular plane was not less than 100 μm and less than 200 μm.
X: A maximum height of an irregular plane was not less than 200 μm.

Evaluation of product warpage: The presence or the absence of up-and-down and left-and-right warpage relative to an extrusion molding direction of a profile extruded product were evaluated as follows.
Presence: Warpage was present.
Absence: Warpage was absent.
(Evaluation by Direct Blow Molding)

Figure 2:
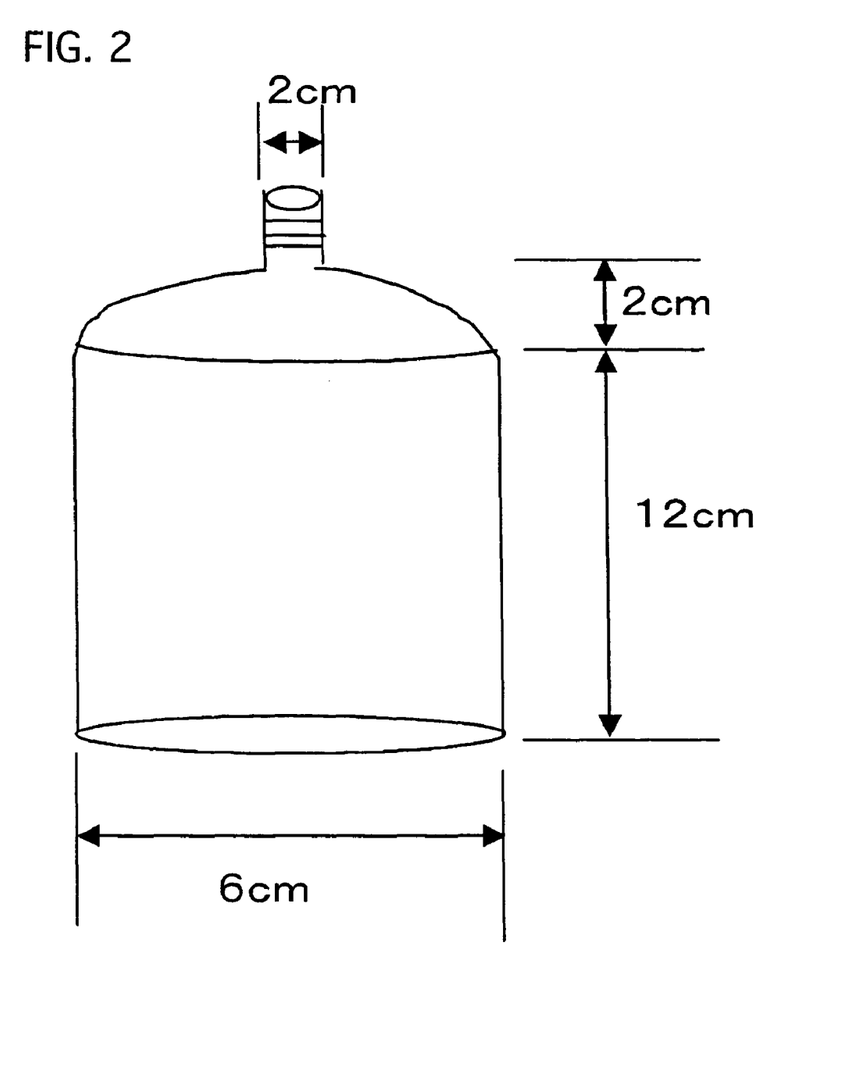
FIG. 2 is a dimensional view of a direct blow bottle.

30 parts by weight of the modifier for a polyester resin and 70 parts by weight of an amorphous polyester (B) were dry-blended, a cylinder temperature of a direct blow molding machine (monoaxial extruder: L/D=25, full flight screw, screw diameter 65 mm) was set at 180 to 230° C., and a bottle shown in FIG. 2 was produced. A die lip for parison molding was attached to a cylinder tip, the blow air was sealed in a mold, and a bottle was continuously produced. Thereupon, the parison retaining state, a product precision, and transparency were evaluated according to the following criteria. Results are shown in Table 2.

Parison Retaining State:

○: Degree of drawdown is low, and a shape is retained.

Δ: Degree of drawdown is high, a shape is slightly poor, and blowing is possible anyhow.

X: Degree of drawdown is high, a shape is ruptured, and blowing is not possible.

Product Precision:

○: Burr is small, and a wall thickness is uniform.

X: Burr is large, and wall thickness is not uniform.

Transparency:

○: Extremely transparent

X: Inferior in transparency (Evaluation by Calendar Molding)

30 parts by weight of the modifier for a polyester resin, and 70 parts by weight of an amorphous polyester (B) were dry-blended, 1 part by weight of a glycerin higher fatty acid ester compound as a glidant was blended, and the materials were kneaded on two 6 inch test rolls set at 200° C. The materials were mixed while a resin adhered to a test roll was peeled with a spatula sometimes and, after 5 minutes of kneading, a roll interval was set to be 0.3 mm (a sheet thickness was set to be 0.3 mm), a melt sheet was pulled to a distance of 30 cm from a roll and, thereupon, sagging was observed by visual evaluation, thereby, pulling property of a sheet was evaluated. Thereupon, peelability of a sheet from a roll was also evaluated. Evaluation criteria are as follows.

Sheet peelability:

○: Peelability from a roll is better.

Δ: Since sticky property to a roll is strong, and peeling becomes difficult sometimes, stably mass production is not possible.

X: Sticky property to a roll is strong, peeling is difficult, and a normal sheet cannot be collected.

Sheet Pulling Property

◉: No sagging.

○: Slight sagging, but the compound can be practically molded.

Δ: A sheet can be produced by adjusting roll temperature condition or the like, but stable mass production is not possible.

X: A melt sheet is sagged by its own weight, and aimed sheet cannot be got.

Transparency:

○: Extremely transparent

X: Inferior in transparency

Examples 2 to 9, Comparative Examples 1 to 12

Using raw materials described in Tables 2 and 3, molding was performed under the same condition as that of Example 1. Regarding Comparative Examples 1 to 6, a stabilizer and a glidant were added to an amorphous polyester resin, and as such, various moldings were performed, followed by evaluation. In Comparative Examples 7 to 9, molding was performed by dry-blending (pellets were blended, the same hereinafter) an impact resistance modifier and an amorphous polyester resin (III). In Comparative Example 10, molding was performed by dry-blending a reactive compound (II) and an amorphous polyester resin. In Comparative Example 11, molding was performed by dry-blending an amorphous polyester (I) and an amorphous polyester (III). In Comparative Example 12, molding was performed by dry-blending an amorphous polyester resin (III), a reactive compound (II) and an impact resistance modifier.

Evaluation results are also shown in Tables 2 and 3.

TABLE 2

| | | Example | | | | | | | | |
|---|---|---|---|---|---|---|---|---|---|---|
| | | 1 | 2 | 3 | 4 | 5 | 6 | 7 | 8 | 9 |
| Amorphous polyester resin (III) | | B 70 | B 60 | A 70 | C 70 | D 80 | E 70 | F 90 | B 65 | E 70 |
| Amorphous polyester resin (I) | A | 27 | 36 | | 27 | | | | 20 | 28 |
| | B | | | 28 | | | | | | |
| | C | | | | | | | | 8 | |
| | D | | | | | | | | 15 | |
| | E | | | | | 18 | | | | |
| | F | | | | | | | 27 | | |
| Reactive compound (II) | I | 3 | 4 | 2 | | | 3 | | | 2 |
| | J | | | | 3 | | | 2 | 5 | |
| | K | | | | | 2 | 10 | | | |
| Stabilizer | L | 0.30 | 0.40 | 0.30 | 0.30 | 0.20 | 0.30 | 0.10 | 0.45 | 0.30 |
| Glidant | M | 0.10 | 0.13 | 0.10 | 0.10 | 0.07 | 0.10 | 0.03 | 0.15 | 0.10 |
| Injection molding | Tendency of increase and decrease in reduced viscosity | ◉ | ◉ | ◉ | ◉ | ◉ | ◉ | ◉ | ◉ | ◉ |
| | Impact resistance test | ○ | ○ | ○ | ○ | ○ | ○ | ○ | ○ | ○ |
| | Transparency | ○ | ○ | ○ | ○ | ○ | ○ | ○ | ○ | ○ |
| Profile molding | Situation of sizing die processing (continuous productivity) | ○ | ○ | ○ | ○ | ○ | ○ | ○ | ○ | ○ |
| | Product dimension precision | ○ | ○ | ○ | ○ | ○ | ○ | ○ | ○ | |
| | Surface smoothness | ○ | ○ | ○ | ○ | ○ | ○ | ○ | ○ | ○ |

TABLE 2-continued

| | | Example | | | | | | | | |
|---|---|---|---|---|---|---|---|---|---|---|
| | | 1 | 2 | 3 | 4 | 5 | 6 | 7 | 8 | 9 |
| | Presence or absence of product warpage | Absence | Absence | Absence | Absence | Absence | Absence | Absence | Absence | Absence |
| Direct blow molding | Parison retaining state | ○ | ○ | ○ | ○ | ○ | ○ | ○ | ○ | ○ |
| | Product precision | ○ | ○ | ○ | ○ | ○ | ○ | ○ | ○ | ○ |
| | Transparency | ○ | ○ | ○ | ○ | ○ | ○ | ○ | ○ | ○ |
| Calender processing molding | Sheet peelability | ○ | ○ | ○ | ○ | ○ | ○ | ○ | ○ | ○ |
| | Sheet pulling property | ◎ | ◎ | ◎ | ◎ | ◎ | ◎ | ◎ | ◎ | ◎ |
| | Transparency | ○ | ○ | ○ | ○ | ○ | ○ | ○ | ○ | ○ |

TABLE 3

| | | Comparative Example | | | | | |
|---|---|---|---|---|---|---|---|
| | | 1 | 2 | 3 | 4 | 5 | 6 |
| | Amorphous polyester resin (III) | B 100 | A 100 | C 100 | D 100 | E 100 | F 100 |
| Amorphous polyester resin (I) | A | | | | | | |
| Reactive compound (II) | J | | | | | | |
| Impact resistance modifier | Unsaturated carboxylic acid-modified ethylene-based copolymer | | | | | | |
| | Styrene-based elastomer | | | | | | |
| | Polytetrafluoroethylene organic polymer | | | | | | |
| Stabilizer | L | 0.30 | 0.30 | 0.30 | 0.30 | 0.30 | 0.30 |
| Glidant | M | 0.10 | 0.10 | 0.10 | 0.10 | 0.10 | 0.10 |
| Injection molding | Tendency of increase or decrease in reduced viscosity | x | x | x | x | x | x |
| | Impact resistance test | ○ | Δ | x | Δ | ○ | ○ |
| | Transparency | ○ | ○ | ○ | ○ | ○ | ○ |
| Profile molding | Situation of sizing die processing (continuous productivity) | x | x | x | x | x | x |
| | Product dimension precision | x | x | x | x | x | x |
| | Surface smoothness | ○ | ○ | ○ | ○ | ○ | ○ |
| | Presence or absence of product warpage | Presence | Presence | Presence | Presence | Presence | Presence |
| Direct blow molding | Parison retaining state | Δ | x | x | x | Δ | Δ |
| | Product precision | Δ | x | x | x | Δ | Δ |
| | Transparency | ○ | ○ | ○ | ○ | ○ | ○ |
| Calender processing molding | Sheet peelability | Δ | x | x | x | Δ | Δ |
| | Sheet pulling property | Δ | x | x | x | Δ | Δ |
| | Transparency | ○ | ○ | ○ | ○ | ○ | ○ |

| | | Comparative Example | | | | | |
|---|---|---|---|---|---|---|---|
| | | 7 | 8 | 9 | 10 | 11 | 12 |
| | Amorphous polyester resin (III) | A 80 | B 75 | C 95 | A 90 | B 80 | D 75 |
| Amorphous polyester resin (I) | A | | | | | 20 | |
| Reactive compound (II) | J | | | | 10 | | 5 |
| Impact resistance modifier | Unsaturated carboxylic acid-modified ethylene-based copolymer | 20 | | | | | 20 |
| | Styrene-based elastomer | | 25 | | | | |
| | Polytetrafluoroethylene organic polymer | | | 5 | | | |
| Stabilizer | L | 0.30 | 0.30 | 0.30 | 0.30 | 0.30 | 0.30 |
| Glidant | M | 0.10 | 0.10 | 0.10 | 0.10 | 0.10 | 0.10 |
| Injection molding | Tendency of increase or decrease in reduced viscosity | * | * | * | ○ | x | * |
| | Impact resistance test | ○ | ○ | Δ | ○ | Δ | ○ |
| | Transparency | x | x | x | ○ | ○ | x |
| Profile molding | Situation of sizing die processing (continuous productivity) | ○ | ○ | ○ | Δ | x | ○ |
| | Product dimension precision | Δ | Δ | Δ | ○ | x | Δ |
| | Surface smoothness | Δ | Δ | Δ | ○ | ○ | Δ |

TABLE 3-continued

|  | Presence or absence of product warpage | Presence | Presence | Presence | Absence | Presence | Presence |
|---|---|---|---|---|---|---|---|
| Direct blow molding | Parison retaining state | Δ | Δ | Δ | Δ | x | ○ |
|  | Product precision | Δ | Δ | Δ | Δ | x | ○ |
|  | Transparency | x | x | x | ○ | ○ | x |
| Calender processing molding | Sheet peelability | Δ | Δ | Δ | Δ | x | ○ |
|  | Sheet pulling property | ○ | ○ | Δ | ○ | x | ○ |
|  | Transparency | x | x | x | ○ | ○ | x |

*Comparative Examples 7 to 9, and 12 are not dissolved in a measuring solvent, and tendency of increase and decrease in a reduced viscosity cannot be determined.

A stabilizer and a glidant described in Tables mean the following compounds.

L: Bis[S-(4-tert-butyl-3-hydroxy-2,6-dimethylbenzyl)]thioterephthalate
M: Glycerin monostearic acid ester In addition, blending ratios in Tables are described, letting a total weight of {amorphous polyester resin (III) (or crystalline polyester resin (IV))+amorphous polyester resin (I)+reactive compound (II)} to be 100, and a stabilizer and an additive are expressed as an addition weight relative thereto.

Example 10

90 parts by weight of an amorphous polyester resin (B) and 10 parts by weight of a reactive compound (J) were mixed, the mixture was melt-kneaded with an extruder (L/D=30, screw diameter=20 mm, full flight, compression ratio 2.0) set at rotation number of 30 rpm, and a whole barrel temperature of 190° C., extruded into a string through a nozzle, and cut with a cutter in water to obtain a pelletized modifier for a polyester resin. Then, 20 parts by weight of the resulting modifier for a polyester resin, and 80 parts by weight of reproduced polyethylene terephthalate (reproduced PET: YPR flake) were dry-blended, and the following various moldings were performed.

A composition of the resulting resin composition is such that reproduced PET is 80 parts by weight, an amorphous polyester resin (B) is 18 parts by weight, and a reactive compound (J) is 2 parts by weight.

(Evaluation by Injection Molding)

20 parts by weight of the resulting modifier for a polyester resin, and 80 parts by weight of reproduced polyethylene terephthalate (reproduced PET: YPR flake) were dry-blended, and a blend was molded into a test piece for a physical property test with an injection molding machine (Toshiba IS-100E: mold locking force 100 ton) under the condition of a cylinder temperature of 275° C., a mold temperature of 30° C. and a rear pressure of 20 kg/cm². Using this, evaluation was performed by the following methods. Results are shown in Table 4.

Tendency of Increase and Decrease in Reduced Viscosity:
◉: Increase in reduced viscosity by 15% or more
○: Absence of increase and decrease in reduced viscosity
X: Reduction in reduced viscosity
Impact resistance test: Izod with notch impact strength (ASTM D-256) test temperature 23° C.
○: 50 J/m or more
Δ: Not less than 30 J/m and less than 50 J/m
X: Less than 30 J/m
Transparency: A test piece was press-molded into a plate having a thickness of 1 mm, and transparency thereof was determined with naked eyes.
○: Transparent
X: Opaque (Evaluation by Profile Molding)

20 parts by weight of the resulting modifier for a polyester resin, and 80 parts by weight of reproduced polyethylene terephthalate (reproduced PET: YPR flake) were dry-blended, a cylinder temperature was set at 200° C., a dye lip for producing a molded article shown in FIG. 1 was attached to a monoaxial extruder (L/D=25, full flight screw, screw diameter 65 mm), then, a sizing die for deciding a final dimension of a profile extrusion product was attached to a tip of a cooling water bath, and the blend was molded with profile molding facilities equipped with a pulling machine through a water bath. This was used to perform evaluation by the following method. Results are shown in Table 4.

Situation of Sizing Die Processing (Continuous Productivity):
○: A resin was not adhered in a sizing die, processability was smooth, and an edge shape precision of a molded article between die and sizing dies was high.
X: Resin adhesion was generated in a sizing die, and a step could not be transferred to a sizing step. Alternatively, processability was worse in a sizing step, an edge precision of a molded article was low, and continuous productivity was deteriorated.
Product dimensional precision:
○: The same as designed value.
Δ: A slippage was generated in a range of less than 0.3 mm from a designed value.
X: A slippage of not less than 0.3 mm from a designed value was generated.
Surface smoothness: The irregular state of an outer surface of a molded article was measured using an ultradeep surface shape measuring microscope (VK-8500 manufactured by Keyence) to perform evaluation as follows.
○: A maximum height of an irregular plane was less than 100 μm.
Δ: A maximum height of an irregular plane was not less than 100 μm and less than 200 μm.
X: A maximum height of an irregular plane was not less than 200 μm.
Evaluation of product warpage: The presence or the absence of up-and-down and left-and-right warpage relative to an extrusion molding direction of a profile extruded product were evaluated as follows.
Presence: Warpage was present.
Absence: Warpage was absent.

(Evaluation by T Die Extrusion Sheet Molding)

20 parts by weight of the resulting modifier for a polyester resin, and 80 parts by weight of reproduced polyethylene terephthalate (reproduced PET: YPR flake) were dry-blended, and kneaded with an extruder (L/D=30, screw diameter=20 mm, full flight, compression ratio 2.0) set at a whole barrel temperature of 200° C. at a rotation number of 30 rpm. Then, using the kneaded resin composition, a cylinder temperature of a T die extrusion molding machine (monoaxial extruder; L/D=25, full flight screw, screw diameter 65 mm)

was set at 200° C., and a sheet having a width of 30 cm and a thickness of 400 μm was produced. Thereupon, sagging of a resin to a winding roll was observed by visual evaluation, thereby, pulling property of a sheet was evaluated. In addition, thereupon, sheet peelability from a roll was also evaluated. Evaluation criteria are as follows.

Sheet Peelability:

○: Peelability from a roll is better.

Δ: Since sticky property to a roll is strong, and peeling becomes difficult sometimes, stably mass production is not possible.

X: Sticky property to a roll is strong, peeling is difficult, and a normal sheet cannot be collected.

Sheet Pulling Property

⊚: No sagging.

○: Slight sagging, but the compound can be practically molded.

Δ: A sheet can be produced by adjusting roll temperature condition or the like, but stable mass production is not possible.

X: A melt sheet is sagged by its own weight, and aimed sheet cannot be got.

(Evaluation by Direct Blowing Molding)

20 parts by weight of the resulting modifier for a polyester resin, and 80 parts by weight of reproduced polyethylene terephthalate (reproduced PET: YPR flake) were dry-blended, a cylinder temperature of a direct blow molding machine (monoaxial extruder: L/D=25, full flight screw, screw diameter 65 mm) was set at 180 to 230° C., and a bottle shown in Table 2 was produced. A die lip for parison molding was attached to a cylinder tip, the blow air was sealed into a die, and a bottle was continuously produced. Thereupon, the parison retaining state, product precision, and transparency were evaluated by the following criteria.

Parison Retaining State:

○: Degree of drawdown is low, and a shape is retained.

Δ: Degree of drawdown is high, a shape is slightly poor, and blowing is possible anyhow.

X: Degree of drawdown is high, a shape is ruptured, and blowing is not possible.

Product Precision:

○: Burr is small, and a wall thickness is uniform.

X: Burr is large, and wall thickness is not uniform.

Transparency:

○: Extremely transparent

X: Inferior in transparency (Evaluation by Calendar Molding)

20 parts by weight of the resulting modifier for a polyester resin, and 80 parts by weight of reproduced polyethylene terephthalate (reproduced PET: YPR flake) were dry-blended, 1 part by weight of a glycerin higher fatty acid ester compound as a glidant was blended, and the materials were kneaded on two 6 inch test rolls set at a range of 180 to 230° C. The materials were mixed while a resin adhered to a test roll was peeled with a spatula sometimes and, after 5 minutes of kneading, a roll interval was set to be 0.3 mm (a sheet thickness was set to be 0.3 mm), a melt sheet was pulled to a distance of 30 cm from a roll, thereupon, sagging was observed by visual evaluation, thereby, pulling property of a sheet was evaluated. In addition, thereupon, peelability of a sheet from a roll was also evaluated. Evaluation criteria are as follows.

Sheet Peelability:

○: Peelability from a roll is better.

Δ: Since sticky property to a roll is strong, and peeling becomes difficult sometimes, stably mass production is not possible.

X: Sticky property to a roll is strong, peeling is difficult, and a normal sheet cannot be collected.

Sheet Pulling Property

⊚: No sagging is produced.

○: Slight sagging is produced, but this is not practically problematic.

Δ: A sheet can be produced by adjusting roll temperature condition or the like, but stable mass production is not possible.

X: a melt sheet is sagged by its own weight, and a normal sheet cannot be collected.

Transparency:

○: Extremely transparent

X: Inferior in transparency

Examples 11 to 18, Comparative Examples 13 to 17

Using raw materials described in Tables 4 and 5, molding was performed under the condition described in each Table. Specifically, as in Example 10, an amorphous polyester resin (I), a reactive compound (II) and a stabilizer L or M were melt-kneaded at 200 to 250° C. in advance, the resulting modifier for a polyester resin and a crystalline polyester resin (IV) were dry-blended, a blend was subjected to injection molding, profile molding, T die extrusion sheet molding, direct blow molding, or calendar molding under a temperature which was higher than a melting point by 20° C., and various evaluations were performed.

TABLE 4

|  |  | Example | | | | | | | | |
|---|---|---|---|---|---|---|---|---|---|---|
|  |  | 10 | 11 | 12 | 13 | 14 | 15 | 16 | 17 | 18 |
| Crystalline polyester resin (V) | | Reproduced PET | H | Reproduced PET | Reproduced PET | PET | Reproduced PET | Polylactic acid | PEN | PBN |
| | | 80 | 70 | 80 | 70 | 70 | 65 | 70 | 70 | 70 |
| Amorphous polyester resin (I) | A | | | | 25 | | | 25 | 25 | |
| | B | 18 | 27 | | | 27 | | | | |
| | E | | | | | | 30 | | | 20 |
| | F | | | 10 | | | | | | |

TABLE 4-continued

| | | \multicolumn{9}{c}{Example} | | | | | | | | |
|---|---|---|---|---|---|---|---|---|---|---|
| | | 10 | 11 | 12 | 13 | 14 | 15 | 16 | 17 | 18 |
| Reactive compound (II) | I | | | | 5 | | 5 | 5 | 5 | 10 |
| | J | 2 | 3 | | | 3 | | | | |
| | K | | | 10 | | | | | | |
| Stabilizer | L | | | 0.3 | 0.3 | | 0.3 | 0.3 | 0.3 | 0.3 |
| Glidant | M | | | 0.1 | 0.1 | | 0.1 | 0.1 | 0.1 | 0.1 |
| Injection molding | Tendency of increase and decrease in reduced viscosity | ◉ | ◉ | ◉ | ◉ | ◉ | ◉ | ◉ | ◉ | ◉ |
| | Impact resistance test | ○ | ○ | ○ | ○ | ○ | ○ | ○ | ○ | ○ |
| | Transparency | ○ | ○ | ○ | ○ | ○ | ○ | ○ | ○ | ○ |
| Profile molding | Situation of sizing die processing (continuous productivity) | ○ | ○ | ○ | ○ | ○ | ○ | ○ | ○ | ○ |
| | Product dimension precision | ○ | ○ | ○ | ○ | ○ | Δ | ○ | ○ | Δ |
| | Surface smoothness | ○ | ○ | ○ | ○ | ○ | ○ | ○ | ○ | ○ |
| | Presence or absence of product warpage | Absence | Absence | Absence | Absence | Absence | Absence | Absence | Absence | Absence |
| T die extrusion molding | Sheet peelability | ○ | ○ | ○ | ○ | ○ | ○ | ○ | ○ | ○ |
| | Sheet pulling property | ◉ | ◉ | ◉ | ◉ | ◉ | ◉ | ◉ | ◉ | ◉ |
| Direct blow molding | Parison retaining state | ○ | ○ | ○ | ○ | ○ | ○ | ○ | ○ | ○ |
| | Product precision | ○ | ○ | ○ | ○ | ○ | ○ | ○ | ○ | ○ |
| | Transparency | ○ | ○ | ○ | ○ | ○ | ○ | ○ | ○ | ○ |
| Calender processing molding | Sheet peelability | ○ | ○ | ○ | ○ | ○ | ○ | ○ | ○ | ○ |
| | Sheet pulling property | ◉ | ◉ | ◉ | ◉ | ◉ | ◉ | ◉ | ◉ | ◉ |
| | Transparency | ○ | ○ | ○ | ○ | ○ | ○ | ○ | ○ | ○ |

TABLE 5

| | | Comparative Example | | | | |
|---|---|---|---|---|---|---|
| | | 13 | 14 | 15 | 16 | 17 |
| Crystalline polyester resin (IV) | | PET | PBT | Reproduced PET | Reproduced PET | Reproduced PET |
| | | 100 | 100 | 100 | 70 | 75 |
| Amorphous polyester resin (I) | A | | | | 30 | |
| Reactive compound (II) | I | | | | | 5 |
| Impact resistance modifier | Unsaturated carboxylic acid-modified ethylene-based copolymer | | | | | 20 |
| Stabilizer | L | 0.3 | 0.3 | 0.3 | 0.3 | 0.3 |
| Glidant | M | 0.1 | 0.1 | 0.1 | 0.1 | 0.1 |
| Injection molding | Tendency of increase and decrease in reduced viscosity | x | x | x | x | Not evaluated |
| | Impact resistance test | ○ | ○ | Δ | Δ | ○ |
| | Transparency | ○ | x | ○ | ○ | x |
| Profile molding | Situation of sizing die processing (continuous productivity) | x | x | x | x | ○ |
| | Product dimension precision | x | x | x | x | Δ |
| | Surface smoothness | x | x | x | x | Δ |
| | Presence or absence of product warpage | Presence | Presence | Presence | Presence | Presence |
| T die extrusion molding | Sheet peelability | x | x | Δ | Δ | x |
| | Sheet pulling property | x | x | Δ | ○ | x |
| Direct blow molding | Parison retaining state | x | x | Δ | Δ | x |
| | Product precision | x | x | Δ | Δ | x |
| | Transparency | ○ | ○ | ○ | x | ○ |
| Calender processing molding | Sheet peelability | x | x | Δ | Δ | x |
| | Sheet pulling property | x | x | Δ | ○ | x |
| | Transparency | ○ | ○ | ○ | x | ○ |

As seen from Tables 2 to 5, in Examples 1 to 18, improvement in injection moldability, and improvement in mechanical physical property while maintaining transparency are realized and, regarding profile extrusion processability, improvement in continuous productivity, improvement in a dimension precision/improvement in surface smoothness (removal of chatter mark) of a profile extruded product, improvement in product warpage during continuous production, and improvement in a shape precision at a corner or edge part of a product between die to sizing due to improvement in resin sagging at profile extrusion processing are excellent, as compared with Comparative Examples 1 to 17.

In direct blow molding, since parison retaining is excellent, and a product precision becomes further better while transparency is retained, stability at continuous production, and a conforming article production rate are considerably improved.

In calendar processing molding, since a melt strength of a polyester resin composition is considerably improved, sheet peelability from a roll, and sheet pulling property are improved, and a sheet excellent in a dimension precision and surface property can be stably produced.

INDUSTRIAL APPLICABILITY

By blending the modifier of the present invention in a polyester resin, moldability in melt molding, particularly, injection molding, extrusion molding, profile molding, direct blow molding, and calendar processing molding can be improved and, furthermore, a molded article thereof maintains transparency, and manifests excellent mechanical physical property.

The invention claimed is:

1. A polyester resin composition, prepared by a process comprising:
providing a mixture of an amorphous polyester resin (I) and a reactive compound (II) containing two or more glycidyl groups and/or isocyanate groups per molecule and having a weight average molecular weight of not less than 200 and not more than 500 thousands, wherein only a portion of said two or more glycidyl groups and/or isocyanate groups of said reactive compound (II) is reacted with said amorphous polyester resin (I); and thereafter
mixing said mixture with an amorphous polyester resin (III) to obtain the polyester resin composition.

2. The polyester resin composition according to claim 1, wherein the amorphous polyester resin (I) contains an aromatic dicarboxylic acid of a carbon number of 8 to 14, and an aliphatic or alicyclic glycol of a carbon number of 2 to 10 at 50 mole % or more of an acid component and a glycol component, respectively.

3. The polyester resin composition according to claim 2, wherein the aromatic dicarboxylic acid of a carbon number of 8 to 14 is terephthalic acid and/or isophthalic acid.

4. The polyester resin composition according to claim 2, wherein the aliphatic or alicyclic glycol of a carbon number of 2 to 10 is at least one compound selected from the group consisting of ethylene glycol, diethylene glycol, neopentyl glycol, 1,4-cyclohexanedimethanol, 1,2-propanediol, 1,3-propanediol and 2-methyl-1,3-propanediol.

5. The polyester resin composition according to claim 1, wherein the reactive compound (II) is a copolymer comprising (X) 20 to 99% by weight of vinyl aromatic monomer, (Y) 1 to 80% by weight of hydroxyalkyl (meth)acrylate or glycidylalkyl (meth) acrylate, and (Z) 0 to 79% by weight of alkyl (meth)acrylate.

6. The polyester resin composition according to claim 1, wherein the amorphous polyester resin (I) contains a polyfunctional compound unit having three or more carboxyl groups and/or hydroxyl groups as a monomer component at 0.001 to 5 mole % of an acid component and/or a glycol component, respectively.

7. The polyester resin composition according to claim 1, wherein the amorphous polyester resin (III) contains an aromatic dicarboxylic acid of a carbon number of 8 to 14, and an aliphatic or alicyclic glycol of a carbon number of 2 to 10 at 50 mole or more of an acid component and a glycol component, respectively.

8. The polyester resin component according to claim 7, wherein the aromatic dicarboxylic acid of a carbon number of 8 to 14 is terephthalic acid and/or isophthalic acid.

9. The polyester resin composition according to claim 7, wherein the aliphatic or alicyclic glycol of a carbon number of 2 to 10 is at least one compound selected from the group consisting of ethylene glycol, diethylene glycol, neopentyl glycol, 1,4-cyclohexanedimethanol, 1,2-propanediol, 1,3-propanediol and 2-methyl-1,3-propanediol.

10. The polyester resin composition according to claim 1, wherein the amorphous polyester resin (III) contains a polyfunctional compound unit having three or more carboxyl groups and/or hydroxyl groups as a monomer component at 0.001 to 5 mole % of an acid component and/or a glycol component, respectively.

11. A polyester resin composition, prepared by a process comprising:
providing a mixture of an amorphous polyester resin (I) and a reactive compound (II) containing two or more glycidyl groups and/or isocyanate groups per molecule and having a weight average molecular weight of not less than 200 and not more than 500 thousands, wherein only a portion of said two or more glycidyl groups and/or isocyanate groups of said reactive compound (II) is reacted with said amorphous polyester resin (I); and thereafter
mixing said mixture with a crystalline polyester resin (IV) to obtain the polyester resin composition.

12. The polyester resin composition according to claim 11, wherein the amorphous polyester resin (I) contains an aromatic dicarboxylic acid of a carbon number of 8 to 14 and an aliphatic or alicyclic glycol of a carbon number of 2 to 10 at 50 mole % or more of an acid component and a glycol component, respectively.

13. The polyester resin composition according to claim 12, wherein the aromatic dicarboxylic acid of a carbon number of 8 to 14 is terephthalic acid and/or isophthalic acid.

14. The polyester resin composition according to claim 12, wherein the aliphatic or alicyclic glycol of a carbon number of 2 to 10 is at least one compound selected from a group consisting of ethylene glycol, diethylene glycol, neopentyl glycol, 1,4-cyclohexanedimethanol, 1,2-propanediol, 1,3-propanediol and 2-methyl-1,3-propanediol.

15. The polyester resin composition according to claim 11, wherein the reactive compound (II) is a copolymer comprising (X) 20 to 99% by weight of vinyl aromatic monomer, (Y) 1 to 80% by weight of hydroxyalkyl (meth)acrylate or glycidylalkyl (meth) acrylate and (Z) 0 to 79% by weight of alkyl (meth)acrylate.

16. The polyester resin composition according to claim 11, wherein the amorphous polyester resin (I) contains a polyfunctional compound unit having three or more carboxyl groups and/or hydroxy groups as a monomer component at 0.001 to 5 mol % of an acid component and/or a glycol component, respectively.

17. The polyester resin composition according to claim 11, wherein the crystalline polyester resin (IV) is polyethylene terephthalate, polybutylene terephthalate or polylactic acid.

18. The polyester resin composition according to claim 11, wherein the crystalline polyester resin (IV) is reproduced polyethylene terephthalate.

19. A process for producing a molded article, comprising:
(a) providing a mixture of an amorphous polyester resin (I) and a reactive compound (II) containing two or more glycidyl groups and/or isocyanate groups per molecule and having a weight average molecular weight of not less than 200 and not more than 500 thousands, and wherein a portion of said two or more glycidyl groups and/or isocyanate groups of said reactive compound (II) is reacted with said amorphous polyester resin (I);
(b) mixing said mixture with an amorphous polyester resin (III) and/or a crystalline polyester resin (IV); and (c) melt molding the product of step (b) to form the molded article.

20. The process for producing a molded article according to claim 19, wherein the amorphous polyester resin (I) contains an aromatic dicarboxylic acid of a carbon number of 8 to 14, and an aliphatic or alicyclic glycol of a carbon number of 2 to 10 at 50 mole % or more of an acid component and a glycol component, respectively.

21. The process for producing a molded article according to claim 20, wherein the aromatic dicarboxylic acid of a carbon number of 8 to 14 is terephthalic acid and/or isophthalic acid.

22. The process for producing a molded article according to claim 20, wherein the aliphatic or alicyclic glycol of a carbon number of 2 to 10 is at least one compound selected from a group consisting of ethylene glycol, diethylene glycol, neopentyl glycol, 1,4-cyclohexanedimethanol, 1,2-propanediol, 1,3-propanediol and 2-methyl-1,3-propanediol.

23. The process for producing a molded article according to claim 19, wherein the reactive compound (II) is a copolymer comprising (X) 20 to 99% by weight of vinyl aromatic monomer, (Y) 1 to 80% by weight of hydroxyalkyl (meth) acrylate or glycidylalkyl (meth)acrylate, and (Z) 0 to 79% by weight of alkyl (meth)acrylate.

24. The process for producing a molded article according to claim 19, wherein the amorphous polyester resin (I) contains a polyfunctional compound unit having three or more carboxyl groups and/or hydroxy groups as a monomer component at 0.001 to 5 mole % of an acid component and/or a glycol component, respectively.

25. The process for producing a molded article according to claim 19, wherein the amorphous polyester resin (III) contains an aromatic dicarboxylic acid of a carbon number of 8 to 14 and an aliphatic or alicyclic glycol of a carbon number of 2 to 10 at 50 mole % or more of an acid component and a glycol component, respectively.

26. The process for producing a molded article according to claim 25, wherein the aromatic dicarboxylic acid of a carbon number of 8 to 14 is terephthalic acid and/or isophthalic acid.

27. The process for producing a molded article according to claim 25, wherein the aliphatic or alicyclic glycol of a carbon number of 2 to 10 is at least one compound selected from the group consisting of ethylene glycol, diethylene glycol, neopentyl glycol, 1,4-cyclohexanedimethanol, 1,2-propanediol, 1,3-propanediol and 2-methyl-1,3-propanediol.

28. The process for producing a molded article according to claim 19, wherein the amorphous polyester resin (III) contains a polyfunctional compound unit having three or more carboxyl groups and/or hydroxyl groups as a monomer component at 0.001 to 5 mole % of an acid component and/or a glycol component of a polyester, respectively.

29. The process for producing a molded article according to claim 19, wherein the crystalline polyester resin (IV) is polyethylene terephthalate (PET), polybutylene terephthalate (PBT) or polylactic acid.

30. The process for producing a molded article according to claim 19, wherein the crystalline polyester resin (IV) is reproduced polyethylene terephthalate.

31. A molded article produced by the process according to any one of claims 19 to 30.

* * * * *